United States Patent
Terashita et al.

(10) Patent No.: US 12,509,122 B2
(45) Date of Patent: Dec. 30, 2025

(54) VEHICLE SELECTION DEVICE AND VEHICLE SELECTION METHOD

(71) Applicant: TOYOTA JIDOSHA KABUSHIKI KAISHA, Toyota (JP)

(72) Inventors: Hiroki Terashita, Susono (JP); Hayato Shirai, Shizuoka-ken (JP); Naoyuki Kurake, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 18/243,697

(22) Filed: Sep. 8, 2023

(65) Prior Publication Data
US 2024/0149919 A1    May 9, 2024

(30) Foreign Application Priority Data
Nov. 8, 2022   (JP) ................................ 2022-179003

(51) Int. Cl.
*B60W 60/00* (2020.01)

(52) U.S. Cl.
CPC .............................. *B60W 60/0027* (2020.02)

(58) Field of Classification Search
CPC ....... B60W 60/0027; B60W 2554/406; B60W 2554/804; B60W 60/00; B60W 30/165
See application file for complete search history.

(56) References Cited

U.S. PATENT DOCUMENTS

| | | | |
|---|---|---|---|
| 9,150,221 B2 | 10/2015 | Sato et al. | |
| 9,811,092 B2 | 11/2017 | Obuchi et al. | |
| 10,620,639 B2 | 4/2020 | Taniguchi | |
| 10,890,658 B2 | 1/2021 | Tachibana | |
| 11,158,195 B2 | 10/2021 | Kamata et al. | |
| 2012/0123659 A1* | 5/2012 | Sato | G08G 1/163 701/96 |
| 2016/0071418 A1* | 3/2016 | Oshida | B60W 30/165 701/23 |
| 2020/0057453 A1* | 2/2020 | Laws | B60W 10/04 |
| 2020/0168102 A1 | 5/2020 | Kamata et al. | |
| 2021/0366288 A1* | 11/2021 | Kim | B60W 30/165 |
| 2023/0166613 A1* | 6/2023 | Braunstein | H02J 7/0063 701/25 |
| 2023/0286598 A1* | 9/2023 | Beller | B62D 35/002 |

FOREIGN PATENT DOCUMENTS

JP    2010-146428 A    7/2010

* cited by examiner

*Primary Examiner* — Khoi H Tran
*Assistant Examiner* — Tien Minh Le
(74) *Attorney, Agent, or Firm* — Dinsmore & Shohl LLP

(57) ABSTRACT

A vehicle selection device includes a processor. The processor is configured to execute a selection process of selecting, as a target vehicle to be followed by a specific vehicle, a preceding vehicle candidate that satisfies one or more selection conditions based on surrounding vehicle information being information on one or more preceding vehicle candidates around the specific vehicle. In the selection process, the processor is configured to change the one or more selection conditions in accordance with traveling environment information around the specific vehicle.

7 Claims, 6 Drawing Sheets

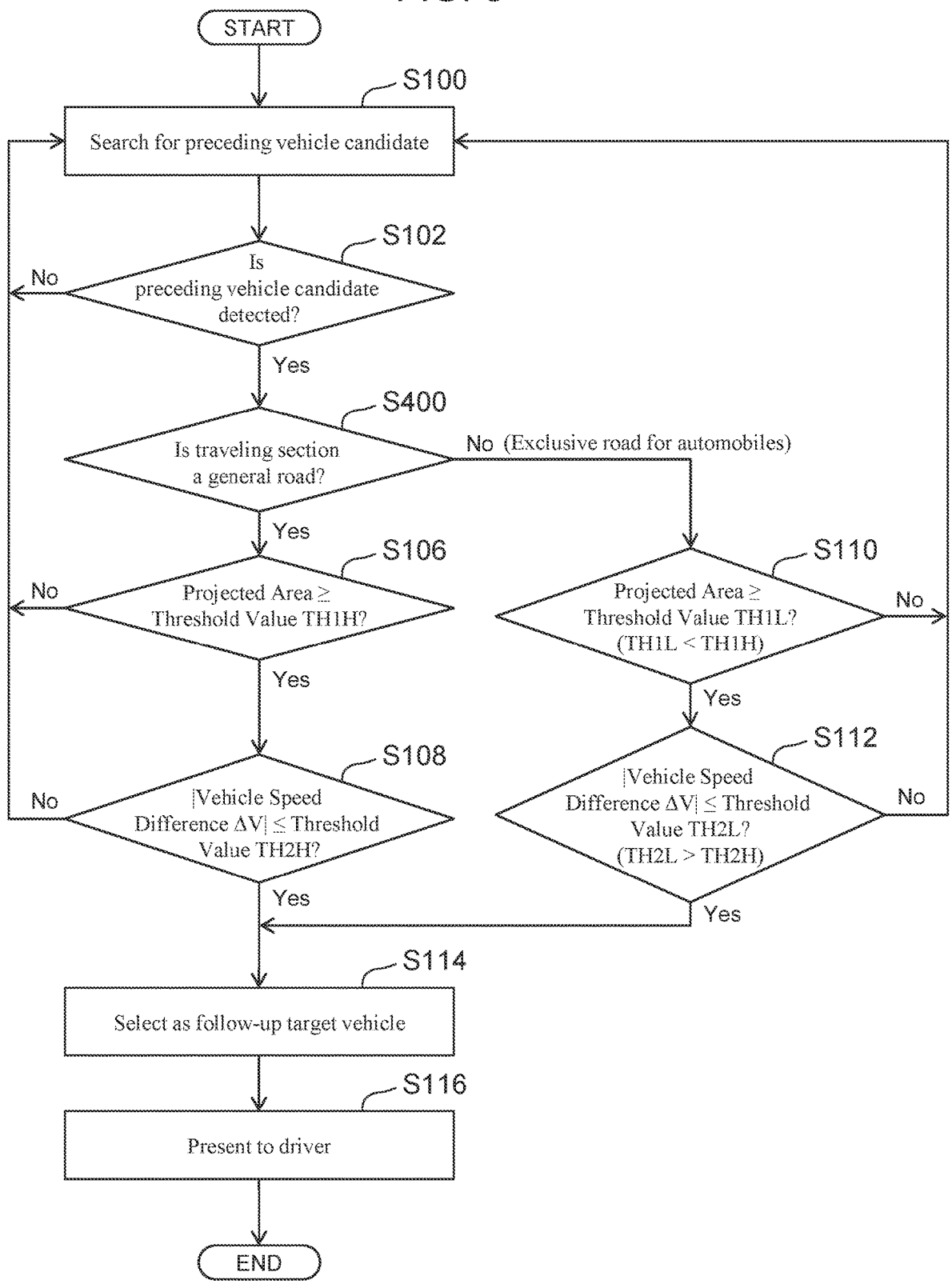

VEHICLE SELECTION DEVICE AND VEHICLE SELECTION METHOD

CROSS-REFERENCES TO RELATED APPLICATION

The present disclosure claims priority under 35 U.S.C. § 119 to Japanese Patent Application No. 2022-179003, filed on Nov. 8, 2022, which is incorporated herein by reference in its entirety.

TECHNICAL FIELD

The present disclosure relates to a vehicle selection device and a vehicle selection method for selecting a target vehicle to be followed.

BACKGROUND

JP 2010-146428 A discloses a system for searching for a target vehicle to be followed by a reference vehicle such as an ego vehicle (i.e., a subject vehicle). In this system, a vehicle having the highest follow-up target evaluation value indicating a degree of suitability as the target vehicle to be followed is selected as the target vehicle. The follow-up target evaluation value is calculated from a driver evaluation value based on driver information and a vehicle evaluation value based on vehicle information representing the characteristics of vehicles.

SUMMARY

Regarding the selection of the target vehicle to be followed, the technique disclosed in JP 2010-146428 A does not consider the traveling environment around the ego vehicle, such as a traffic volume. As a result, for example, when the traffic volume around the ego vehicle is low, finding a vehicle suitable for the follow-up may be difficult. That is, increasing the frequency of performing the follow-up driving may be difficult. On the other hand, when the traffic volume is high, the target vehicle is likely to be frequently selected. As a result, an opportunity to follow a vehicle more suitable for the follow-up may be lost.

The present disclosure has been made in view of the problem described above, and an object of the present disclosure is to provide a vehicle selection device and a vehicle selection method that can achieve follow-up to a vehicle suitable for the follow-up at an appropriate frequency.

A vehicle selection device according to the present disclosure includes a processor. The processor is configured to execute a selection process of selecting, as a target vehicle to be followed by a specific vehicle, a preceding vehicle candidate that satisfies one or more selection conditions based on surrounding vehicle information being information on one or more preceding vehicle candidates around the specific vehicle. In the selection process, the processor is configured to change the one or more selection conditions in accordance with traveling environment information around the specific vehicle.

A vehicle selection method according to the present disclosure is a method of selecting, with a computer, a target vehicle to be followed by a specific vehicle. The vehicle selection method includes: executing a selection process of selecting, as the target vehicle, a preceding vehicle candidate that satisfies one or more selection conditions based on surrounding vehicle information being information on one or more preceding vehicle candidates around the specific vehicle; and changing the one or more selection conditions in accordance with traveling environment information around the specific vehicle.

According to the present disclosure, the specific vehicle can follow a vehicle suitable for the follow-up at an appropriate frequency.

BRIEF DESCRIPTION OF DRAWINGS

FIG. 6 is a flowchart illustrating another example of the processing related to the follow-up driving assistance according to the embodiment.

DETAILED DESCRIPTION

Figure 1:
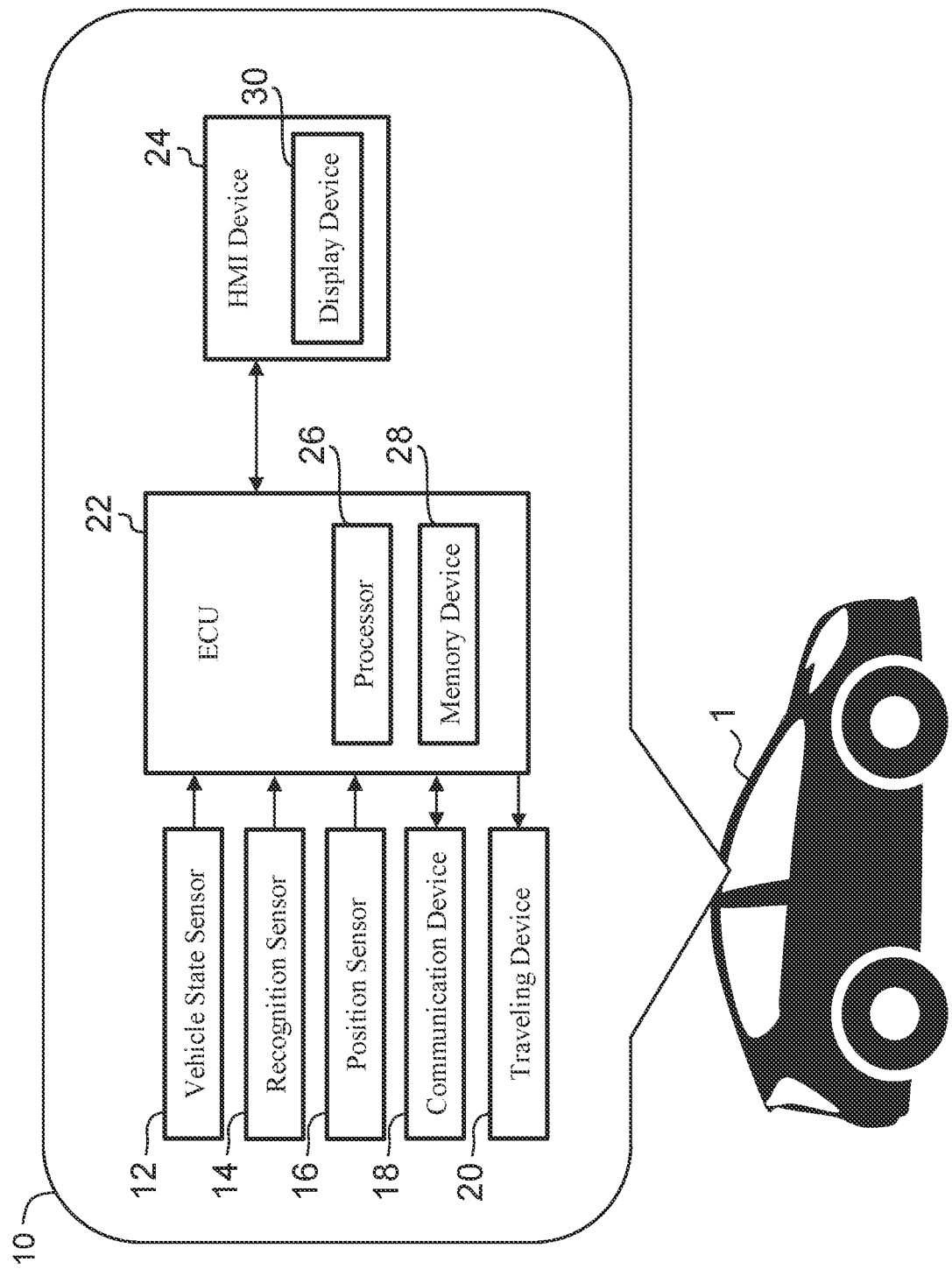
FIG. 1 is a diagram schematically illustrating an example of a configuration of a vehicle control system to which a vehicle selection device according to an embodiment is applied.

Hereinafter, a vehicle selection device and a vehicle selection method according to embodiments of the present disclosure will be described with reference to the accompanying drawings. In the drawings, common elements are denoted by the same reference numerals, and redundant description thereof will be omitted or simplified.

1. Configuration of Vehicle Control System

FIG. 1 is a diagram schematically illustrating an example of a configuration of a vehicle control system 10 to which a vehicle selection device according to an embodiment is applied. As an example, the "vehicle selection device" according to the present disclosure is included in the vehicle control system 10. The vehicle control system 10 is mounted on the vehicle 1 and is configured to execute various controls of a vehicle 1. The vehicle control system 10 includes a vehicle state sensor 12, a recognition sensor 14, a position sensor 16, a communication device 18, a traveling device 20, an electronic control unit (ECU) 22, and a human machine interface (HMI) device 24.

The vehicle state sensor 12 is configured to detect a state of the vehicle 1. The vehicle state sensor 12 includes, for example, a vehicle speed sensor, an acceleration sensor, and a yaw rate sensor.

The recognition sensor 14 is configured to recognize (detect) a situation around the vehicle 1. For example, the recognition sensor 14 includes a millimeter wave radar, a camera, a laser imaging detection and ranging (LIDAR), or any combination thereof.

The position sensor 16 is configured to detect a position and orientation of the vehicle 1. For example, the position sensor 16 includes a global navigation satellite system (GNSS) receiver.

The communication device 18 is configured to communicate with the outside of the vehicle 1. The communication device 18 may include, for example, a vehicle-to-vehicle communication device that enables communication between the vehicle 1 and one or more vehicles around the vehicle 1 (i.e., vehicle-to-vehicle communication (V2V)).

The traveling device 20 is configured to operate the vehicle 1. For example, the traveling device 20 includes a driving device, a braking device, and a steering device. The driving device includes, for example, at least one of an electric motor and an internal combustion engine for driving (accelerating) the vehicle 1. The braking device includes a brake actuator for braking (decelerating) the vehicle 1. The steering device includes, for example, a steering motor for steering the vehicle 1.

The ECU 22 is a computer configured to control the vehicle 1. The ECU 22 includes a processor 26 and a memory device 28. The processor 26 executes various processes. The memory device 28 stores various types of information necessary for the processes by the processor 26. The memory device 28 is, for example, at least one of a volatile memory, a nonvolatile memory, a hard disk drive (HDD), and a solid state drive (SSD). It should be noted that the ECU 22 may be configured by combining a plurality of ECUs.

When the ECU 22 (processor 26) executes computer programs, various processes by the ECU 22 are realized. The computer programs are stored in the memory device 28. Alternatively, the computer programs are recorded on a computer-readable recording medium. More specifically, the computer programs include a vehicle search program to search for a vehicle suitable for a follow-up driving performed by the vehicle 1 which is traveling.

The various types of information described above include map information, vehicle state information, surrounding situation information, and position information. More specifically, the vehicle state information is information indicating a state of the vehicle 1, such as a vehicle speed, an acceleration, or a yaw rate, and is acquired using the vehicle state sensor 12. The surrounding situation information is information indicating a situation around the vehicle 1, and is acquired using the recognition sensor 14. The position information is information indicating a position and orientation of the vehicle 1, and is acquired from a measurement result by the position sensor 16.

Additionally, the processor 26 included in the ECU 22 corresponds to an example of the "processor" according to the present disclosure. However, the processor may not necessarily be mounted on the vehicle 1. For example, the processor may be included in a server that can communicate with the vehicle 1 via a communication network, or may be included in a mobile terminal (for example, a smartphone or a tablet terminal) of a person in the vehicle 1.

The HMI device 24 transmits and receives information between the vehicle 1 and a person (for example, a driver) in the vehicle 1. The HMI device 24 includes an output unit that outputs information to the person in the vehicle 1 and an input unit (for example, a touch panel, an operation button, an operation switch, or a microphone) to which information is input by the person in the vehicle 1. The output unit includes a display device 30. The display device 30 is, for example, a display (for example, a meter panel) mounted on an instrument panel of the vehicle 1, or a head-up display (HUD) that displays information on a windshield of the vehicle 1. The output of the ECU 22 is notified to the person in the vehicle 1 via the HMI device 24, and the input from the person in the vehicle 1 is transmitted to the ECU 22 via the HMI device 24. It should be noted that a mobile terminal (for example, smartphones or a tablet terminal) of the person in the vehicle 1 may be communicably connected to the ECU 22 in a wired or wireless manner, and may function as the HMI device 24. Also, in an example in which the vehicle 1 includes a navigation device, the HMI device 24 may be integrated with the navigation device.

2. Follow-Up Driving Assistance

In the present embodiment, the vehicle control system 10 functions as an advanced driving assistant system (ADAS) and has driving assistance functions. One of the driving assistance functions is "follow-up driving assistance" for assisting the follow-up driving of the vehicle (i.e., subject vehicle or ego vehicle) 1 to a preceding vehicle. According to the follow-up driving, the air resistance acting on the subject vehicle 1 during the travel can be reduced, and the energy (at least one of the fuel consumption and the electric power consumption) needed for the travel of the subject vehicle 1 can therefore be reduced.

It should be noted that the subject vehicle 1 corresponds to an example of the "specific vehicle" according to the present disclosure. The specific vehicle is a vehicle caused to travel so as to follow a preceding vehicle, but is not necessarily limited to the subject vehicle, and may be any designated vehicle. In the following example, the specific vehicle is the subject vehicle 1.

In order to achieve the follow-up assistance, the memory device 28 of the ECU 22 stores the vehicle search program, as has already been described. A "selection process" is executed by the ECU 22 (processor 26) executing the vehicle search program. Specifically, in the selection process, the ECU 22 selects, as a "target vehicle to be followed" by the subject vehicle 1, a preceding vehicle candidate that satisfies one or more "selection conditions C" based on "surrounding vehicle information".

The surrounding vehicle information is information related to one or more preceding vehicle candidates around the subject vehicle 1. The surrounding vehicle information is, as an example, projected area information of each preceding vehicle candidate, vehicle speed information of each preceding vehicle candidate, and driving history information of a driver of each preceding vehicle candidate. This kind of surrounding vehicle information may be included in the surrounding situation information described above. That is, the surrounding vehicle information is acquired using, for example, the recognition sensor 14. Alternatively, the surrounding vehicle information may be acquired using the vehicle-to-vehicle communication instead of or together with the recognition sensor 14, for example.

The one or more selection conditions C are used to determine whether or not a preceding vehicle candidate is suitable for being followed by the subject vehicle 1. The one or more selection conditions C include, for example, at least one of selection conditions C1 and C2.

The selection condition C1 is that a preceding vehicle candidate is likely to achieve an energy-saving effect by the follow-up driving. Specifically, the selection condition C1 is, for example, that the projected area (e.g., forward projected area) of the preceding vehicle candidate is equal to or greater than a designated value TH1. Alternatively, the selection condition C1 may be, for example, that an air resistance coefficient (Cd value) of the preceding vehicle candidate, which is another example of the surrounding vehicle information, is equal to or greater than a designated value.

The selection condition C2 is used to determine whether or not a preceding vehicle candidate is traveling at an appropriate vehicle speed. Specifically, the selection condition C2 is, for example, that an absolute value of the difference in vehicle speed between the subject vehicle 1 and the preceding vehicle candidate (i.e., vehicle speed difference ΔV) is less than or equal to a designated value TH2 (i.e., that the preceding vehicle candidate is traveling at substantially the same vehicle speed as the subject vehicle 1). Alternatively, the selection condition C2 may be, for example, that the vehicle speed of the preceding vehicle candidate is equal to or higher than a designated value.

Moreover, the one or more selection conditions C may include, for example, a selection condition C3 together with at least one of the selection conditions C1 and C2, or instead of at least one of them. Specifically, the selection condition C3 is that a period from the acquisition of a driving license by the driver of the preceding vehicle candidate (i.e., the driving history) is equal to or longer than a designated value TH3 (i.e., the driving history is not too short).

Furthermore, the one or more selection conditions C may include, for example, at least one of the following selection conditions C4 and C5. Specifically, the selection condition C4 is that the number of notifications based on the record of the notifications of the selection results of the follow-up target vehicles in the past is equal to or less than a designated value TH4. The selection condition C5 is that a driving score based on the most recent driving history of the preceding vehicle candidate is equal to or greater than a threshold value TH5. This driving score is, for example, a fuel consumption score, and a higher driving score indicates better driving.

In addition, the one or more selection conditions C described above are changed in accordance with traveling environment information such as a traffic volume described below. The conditions for determining whether or not a preceding vehicle candidate is suitable for being followed by the subject vehicle 1 may include, for example, the following selection condition C' that is not changed in accordance with the traveling environment information, together with the one or more selection conditions C. That is, for example, the selection condition C' may be set to be strict when a feedback indicating that the function of notifying the selection result of the follow-up target vehicle is troublesome is received from the driver of the subject vehicle 1. Also, the selection condition C' may be set, for example, based on the driving characteristics of the driver estimated from the driving history of the subject vehicle 1. Specifically, when it can be determined that the driver is not aggressive to increase the speed of the subject vehicle 1 based on the driving characteristics, the selection condition C' may be set to be stricter than when it can be determined that the driver is aggressive to increase the speed. Furthermore, in consideration of concern about, for example, an object falling from the preceding vehicle candidate, the selection condition C' may be set to be stricter when the preceding vehicle candidate has a load than when the preceding vehicle candidate does not have a load.

As will be described below with reference to FIG. 5, the subject vehicle 1 may be an automated driving vehicle, but here, an example in which the driver performs driving (more specifically, at least a part of the driving operation) of the subject vehicle 1 will be described. In this example, the ECU 22 presents a selected preceding vehicle candidate (that is, a follow-up target vehicle) to the driver of the subject vehicle 1 using the HMI device 24. In other words, the ECU 22 proposes the driver to follow the follow-up target vehicle.

Figure 2:
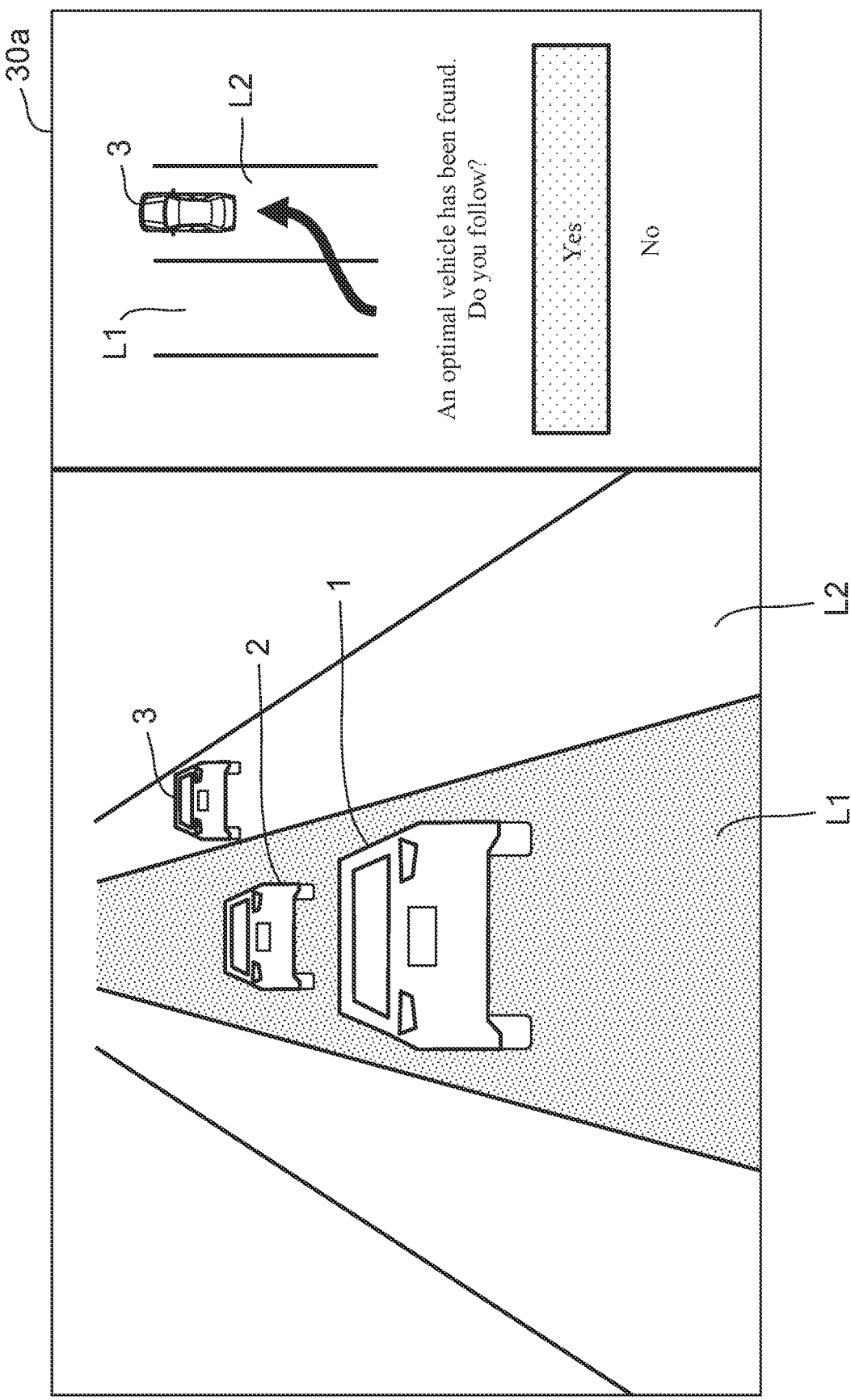
FIG. 2 is a diagram showing an example of a proposal for follow-up driving using an HMI device shown in FIG. 1.

FIG. 2 is a diagram showing an example of a proposal for follow-up driving using the HMI device 24 shown in FIG. 1. FIG. 2 shows a screen 30a of the display device 30 of the HMI device 24. In the scene shown in FIG. 2, a preceding vehicle candidate 2 is present ahead of the subject vehicle 1 in a travel lane L1 of the subject vehicle 1. Also, a preceding vehicle candidate 3 selected as the follow-up target vehicle is present in a travel lane L2 adjacent to the travel lane L1.

In the example shown in FIG. 2, following the preceding vehicle candidate 3 (the follow-up target vehicle) is proposed to the driver of the subject vehicle 1. Specifically, for example, a message "An optimal vehicle has been found. Do you follow?" is displayed on the screen 30a, and a button for requesting the driver's answer (yes/no) to the proposal is displayed on the screen 30a. It should be noted that the notification of the selection result of the follow-up target vehicle by the "notification device" according to the present disclosure, such as the HMI device 24, may be performed by using, for example, a voice together with or instead of the display by the display device 30 as in the example illustrated in FIG. 2.

In addition, when the driver accepts the proposal of the follow-up driving using the HMI device 24, the driver himself/herself may operate the subject vehicle 1 to perform the follow-up driving to the follow-up target vehicle. Furthermore, for example, when the vehicle control system 10 is configured to be able to execute adaptive cruise control (ACC) that automatically controls the speed of the subject vehicle 1 so as to maintain the inter-vehicle distance (or inter-vehicle time) from a preceding vehicle, the driver may perform the follow-up driving while using the ACC.

In the follow-up driving assistance described above, when the traffic volume around the subject vehicle 1 is small, it is difficult to find a vehicle suitable for the follow-up (that is, a preceding vehicle candidate that satisfies the one or more selection conditions C described above). That is, it is difficult to increase the frequency at which the subject vehicle 1 performs the follow-up driving. On the other hand, when the traffic volume is large, the follow-up target vehicle is likely to be frequently selected. As a result, there is a possibility that an opportunity to select a vehicle more suitable for the follow-up may be lost. In addition, in an example in which the selected follow-up target vehicle is presented to the driver using the HMI device 24 (see FIG. 2), if the follow-up target vehicle is frequently selected, the driver may feel uncomfortable with complicated proposals.

In view of the issue described above, according to the present embodiment, in the selection process, the ECU 22 changes the one or more selection conditions C in accordance with the traffic volume around the subject vehicle 1. More specifically, when the traffic volume is large, the one or more selection conditions C are changed to be stricter than those when the traffic volume is small. On the other hand, when the traffic volume is small, the one or more selection conditions C are changed so as to be more relaxed than those when the traffic volume is large.

Figure 3:
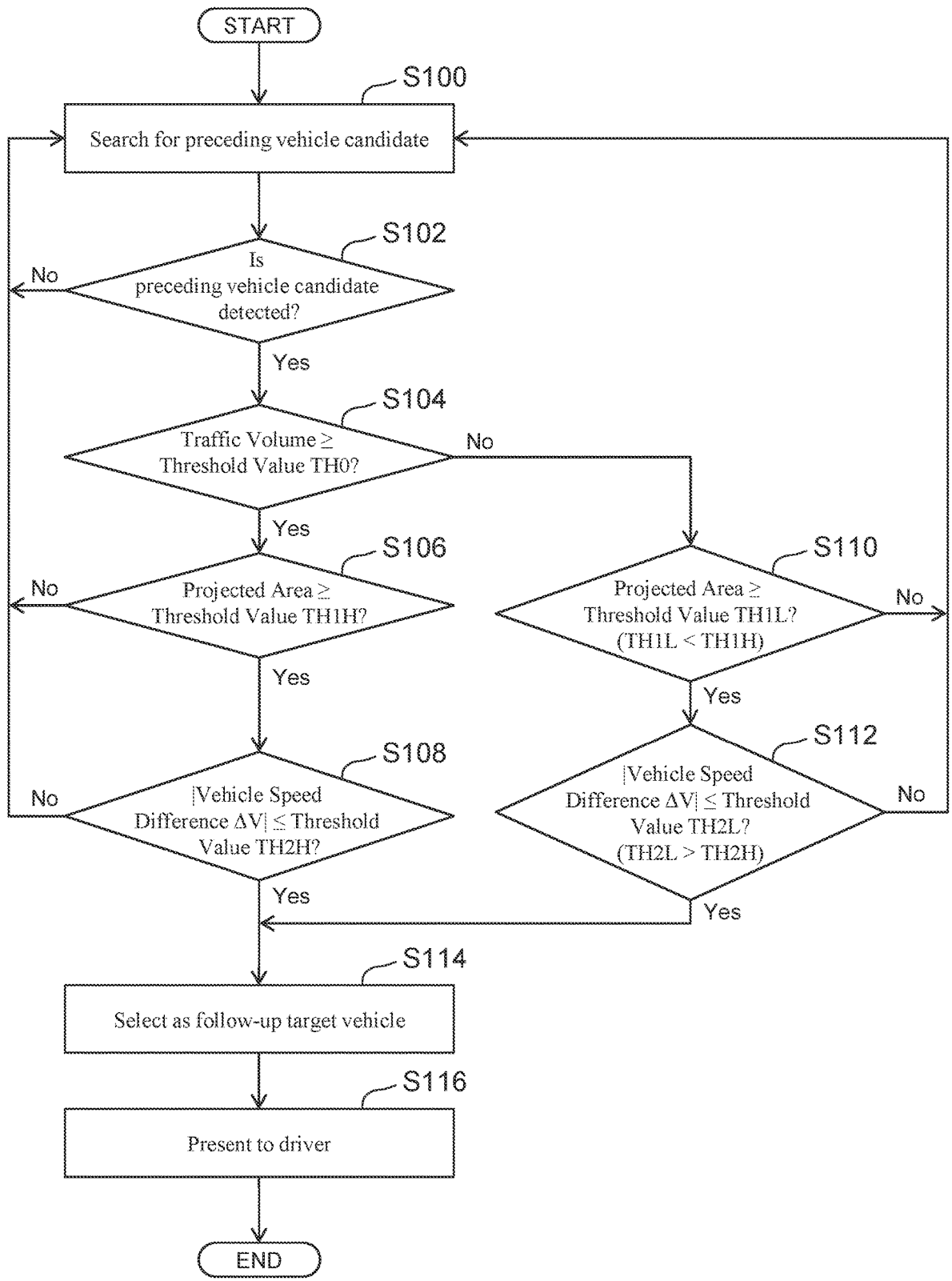
FIG. 3 is a flowchart illustrating an example of processing related to follow-up driving assistance according to the embodiment.

FIG. 3 is a flowchart illustrating an example of processing related to the follow-up driving assistance according to the embodiment. The processing of this flowchart is repeatedly executed when a start condition of the follow-up driving assistance is satisfied. The start condition of the follow-up driving assistance is determined in advance. Specifically, the start condition is satisfied, for example, when the driver of the subject vehicle 1 operates the HMI device 24 to request the start of the follow-up driving assistance or the operation of the ACC. It should be noted that the start condition of the follow-up driving assistance may include, for example, that the subject vehicle 1 is traveling on an exclusive road for automobiles at a speed equal to or higher than a designated value.

In step S100, the ECU 22 (processor 26) executes the vehicle search program described above to search for a preceding vehicle candidate around the subject vehicle 1.

Specifically, the ECU 22 first searches for a preceding vehicle candidate around the subject vehicle 1 using, for example, the output of the recognition sensor 14 or the vehicle-to-vehicle communication.

Then, in step S102, the ECU 22 determines whether or not one or more preceding vehicle candidates have been detected. Specifically, this determination is established when one or more preceding vehicle candidates are detected with the acquisition of the surrounding vehicle information. As a result, when no preceding vehicle candidate is detected (step S102; No), the processing returns to step S100. On the other hand, when one or more preceding vehicle candidates have been detected (step S102; Yes), the processing proceeds to step S104. It should be noted that when a plurality of preceding vehicle candidates are detected in step S102, the processing of step S104 and the subsequent steps is executed for the preceding vehicle candidates one by one.

In step S104, the ECU 22 determines whether or not the current traffic volume around the subject vehicle 1 is equal to or larger than a designated value TH0. The traffic volume is detected based on, for example, the number of preceding vehicle candidates around the subject vehicle 1 detected by the recognition sensor 14. Alternatively, the traffic volume may be detected using, for example, the vehicle-to-vehicle communication.

When it is determined in step S104 that the traffic volume is equal to or larger than the designated value TH0, the processing proceeds to step S106. The determination in step S106 corresponds to an example of determining whether or not a selection condition C1H, which is the selection condition C1 used when the traffic volume is large, is satisfied. Then, the determination in the next step S108 corresponds to an example of determining whether or not a selection condition C2H, which is the selection condition C2 used when the traffic volume is large, is satisfied. When the determination result of steps S106 and S108 are both Yes (that is, when the selection conditions C1H and C2H are both satisfied), a selection condition CH, which is the selection condition C for when the traffic volume is large, is satisfied, and the processing proceeds to step S114. On the other hand, when the determination result of step S106 or S108 is No, the processing returns to step S100.

On the other hand, when the traffic volume is smaller than TH0 in step S104, the processing proceeds to step S110. The determination in step S110 corresponds to an example of determining whether or not a selection condition C1L, which is the selection condition C1 used when the traffic volume is small, is satisfied. Then, the determination in the next step S112 corresponds to an example of determining whether or not 1 selection condition C2L, which is the selection condition C2 used when the traffic volume is small, is satisfied. When the determination results of steps S110 and S112 are both Yes (that is, when the selection conditions C1L and C2L are both satisfied), a selection condition CL, which is the selection condition C for when the traffic volume is small, is satisfied, and the processing proceeds to step S114. On the other hand, when the determination result in step S110 or S112 is No, the processing returns to step S100.

The determinations of steps S106 and S110 are common in that they both relate to the selection condition C1, but are different in the magnitude of threshold values TH1 (TH1H and TH1L). To be more specific, in each of steps S106 and S110, it is determined whether or not the projected area of the preceding vehicle candidate is equal to or greater than the threshold value TH1H or TH1L. The threshold value TH1H used when the traffic volume is large is, for example, 3.0 m2, and the threshold value TH1L used when the traffic volume is small is, for example, 1.0 m2. That is, the threshold value TH1H is greater than the threshold value TH1L. Therefore, the selection condition C1H of step S106 is less likely to be satisfied than the selection condition C1L of step S110, that is, the selection condition C1H is stricter than the selection condition C1L. In other words, the selection condition C1L is more easily satisfied than the selection condition C1H, that is, the selection condition C1L is more relaxed than the selection condition C1H.

Further, the determinations of steps S108 and S112 are common in that they both relate to the selection condition C2, but are different in the magnitude of threshold values TH2 (TH2H and TH2L). To be specific, in each of steps S108 and S112, it is determined whether or not the absolute value of the vehicle speed difference $\Delta V$ is equal to or less than threshold value TH2H or TH2L. The threshold value TH2H used when the traffic volume is large is, for example, 5 km/h, and the threshold value TH1L used when the traffic volume is small is, for example, 15 km/h. That is, the threshold value TH2H is smaller than the threshold value TH2L. Therefore, the selection condition C2H of step S110 is less likely to be satisfied than the selection condition C2L of step S112, that is, the selection condition C2H is stricter than the selection condition C2L. In other words, the selection condition C2L is more easily satisfied than the selection condition C2H, that is, the selection condition C2L is more relaxed than the selection condition C2H.

In step S114, the ECU 22 selects, as the follow-up target vehicle, a preceding vehicle candidate that satisfies the one or more selection conditions C through the processing in the most recent steps S104 to S112. Then, in step S116, the ECU 22 presents the selected follow-up target vehicle to the driver of the subject vehicle 1 using the HMI device 24.

In addition, according to the processing shown in FIG. 3, the strictness/relaxation of the one or more selection conditions C (that is, the difficulty/easiness of establishment of the one or more selection conditions C) is changed in two stages in accordance with the traffic volume. However, instead of this kind of example, the change of the one or more selection conditions C according to the traffic volume (for example, the change of each of the selection conditions C1 and C2) may be executed as follows. That is, the one or more selection conditions C may be changed in three or more stages in accordance with the traffic volume, for example. Alternatively, the one or more selection conditions C may be continuously changed in accordance with the traffic volume, for example. Specifically, the one or more selection conditions C may be changed so as to become stricter in response to an increase in the traffic volume, and conversely so as to become more relaxed in response to a decrease in the traffic volume.

As described above, according to the processing shown in FIG. 3, when the traffic volume around the subject vehicle 1 is small, the one or more selection conditions C are changed to be more relaxed than those when the traffic volume is large. Thus, when the traffic volume is small, the one or more selection conditions C are more likely to be satisfied than those in an example in which the one or more selection conditions C are constant without being based on the traffic volume. As a result, the number of preceding vehicle candidates determined to be suitable for the follow-up increases. This leads to an increase in the frequency with which the subject vehicle 1 performs the follow-up driving.

In other words, according to the processing shown in FIG. 3, when the traffic volume is large, the one or more selection conditions C are changed so as to be stricter than those when the traffic volume is small. As a result, when the traffic volume is large, the one or more selection conditions C are less likely to be satisfied than those in an example in which the one or more selection conditions C are constant without being based on the traffic volume. As a result, the number of preceding vehicle candidates determined to be suitable for the follow-up decreases. More specifically, such a strict selection condition C means that a "preceding vehicle candidate more suitable for the follow-up" can be extracted. This leads to an increase in the chance that the subject vehicle 1 follows the "vehicle more suitable for the follow-up". In addition, in the example in which the selected follow-up target vehicle is presented to the driver using the HMI device 24 (refer to FIG. 2), the above leads to making it difficult for the driver to feel uncomfortable due to the complicated proposal.

As described above, by changing the one or more selection conditions C in accordance with the traffic volume around the subject vehicle 1, it becomes possible to follow a vehicle suitable for the follow-up at an appropriate frequency. In addition, an appropriate follow-up target vehicle can be selected in accordance with the traffic volume. Also, in the example in which the follow-up target vehicle is presented to the driver, it is possible to notify (suggest) the driver of the follow-up target vehicle at an appropriate frequency.

Figure 4:
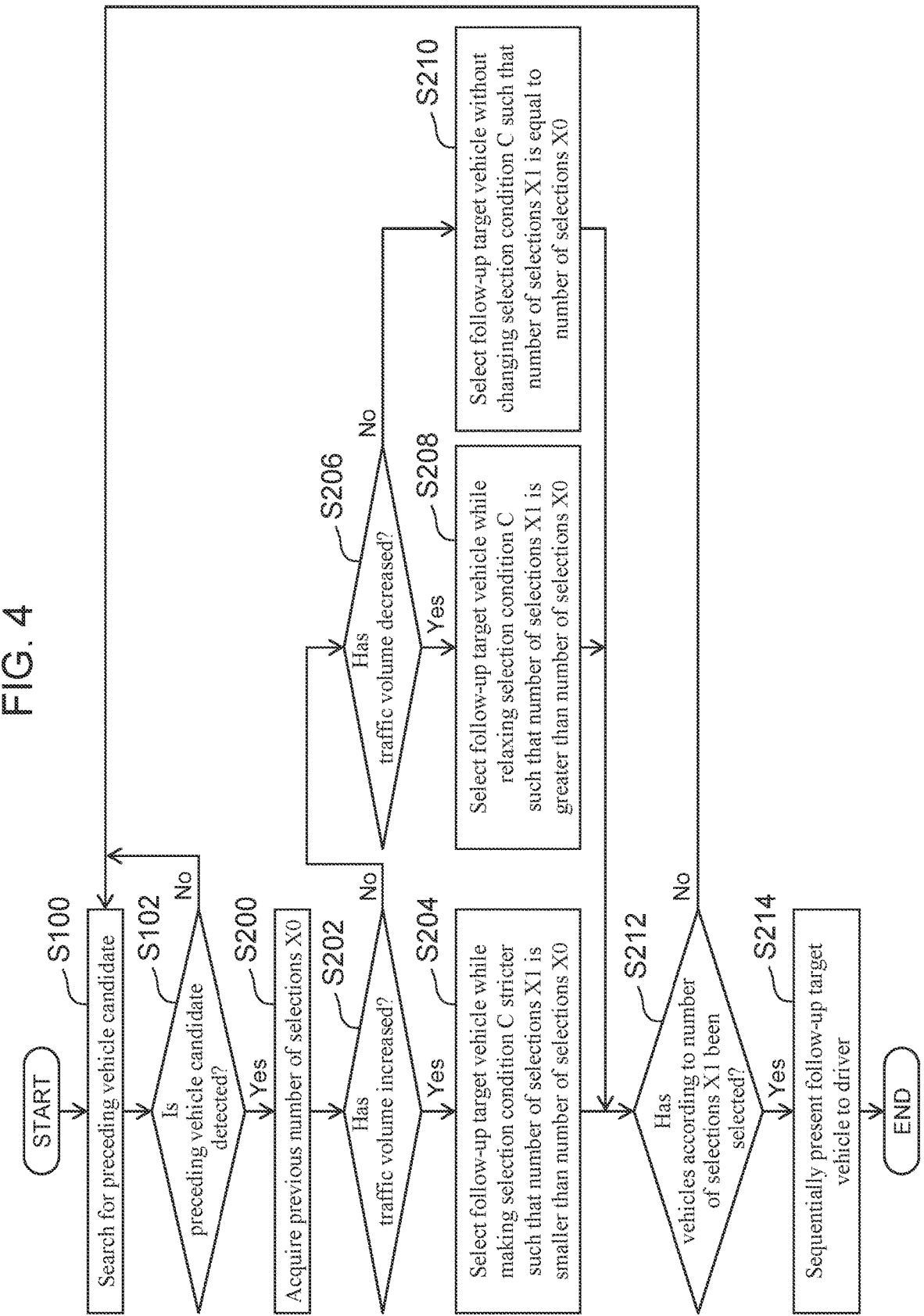
FIG. 4 is a flowchart illustrating an example of processing related to the follow-up driving assistance according to a modification of the embodiment.

3. Modification Example Regarding Change of Selection Condition C According to Traffic Volume FIG. 4 is a flowchart illustrating an example of processing related to the follow-up driving assistance according to a modification of the embodiment. Differences between the processing of the flowchart shown in FIG. 3 and the processing of this flowchart will be described below.

In FIG. 4, when one or more preceding vehicle candidates are detected around the subject vehicle 1 in step S102, the processing proceeds to step S200. In step S200, the ECU 22 acquires a number of selections X0 which is the number of times that selection of follow-up target vehicle is made during a unit time T0 immediately before the current time point (that is, the time point at which the processing has proceeded to step S200). Specifically, for example, the ECU 22 acquires the number of selections X0 from the record of selection of follow-up target vehicle stored in the memory device 28 in association with time. The number of selections X0 corresponds to an example of the "second number of selections" according to the present disclosure.

Then, in step S202, the ECU 22 determines whether or not the traffic volume around the subject vehicle 1 has increased compared to that during the previous unit time T0. As a result, when this determination result is Yes (that is, when the traffic volume has increased), the processing proceeds to step S204.

In step S204, the ECU 22 makes the one or more selection conditions C stricter such that a number of selections X1, which is the number of times that selection of follow-up target vehicle is made during a unit time T1 from the current time point, becomes smaller than the number of selections X0 described above, thereby selecting, as the follow-up target vehicles, preceding vehicle candidates according to the number of selections X1. The number of selections X1 corresponds to an example of the "first number of selections" according to the present disclosure.

To be more specific, as an example, when five preceding vehicle candidates are detected in step S102 when the number of selections X0 is 2 and the number of selections X0 is decreased by 1 to set the number of selections X1 to 1, the one or more selection conditions C are changed to be stricter than that during the previous unit time T0 such that one preceding vehicle candidate among the five preceding vehicle candidates satisfies the one or more selection conditions C. More specifically, for example, when a plurality of selection conditions C, such as the selection conditions C1 and C2, are used, any one of the selection conditions C (for example, C1) may be changed to be stricter in order to select preceding vehicle candidates according to the number of selections X1.

On the other hand, when the determination result in step S202 is No, the ECU 22 determines in step S206 whether or not the traffic volume around the subject vehicle 1 has decreased compared to that during the previous unit time T0. As a result, when the determination result is Yes (i.e., when the traffic volume has decreased), the processing proceeds to step S208.

In step S208, the ECU 22 relaxes the one or more selection conditions C such that the number of selections X1 is greater than the number of selections X0, thereby selecting, as the target vehicles to be followed, candidate preceding vehicles according to the number of selections X1.

To be more specific, as an example, when four preceding vehicle candidates are detected in step S102 when the number of selections X0 is 2 and the number of selections X0 is increased by 1 to set the number of selections X1 to 3, the one or more selection conditions C are changed to be more relaxed than those at the previous preceding unit time T0 such that three preceding vehicle candidates among the four preceding vehicle candidates satisfy the one or more selection conditions C. More specifically, for example, when a plurality of selection conditions C, such as the selection conditions C1 and C2, are used, any one of the selection conditions C (for example, C1) may be changed to be more relaxed in order to select preceding vehicle candidates according to the number of selections X1.

Moreover, when the determination result in step S206 is No (i.e., when the traffic volume has not increased or decreased compared to that during the previous unit time T0), the processing proceeds to step S210. In step S210, the ECU 22 selects preceding vehicle candidates according to the number of selections X1 that is the same as the number of selections X0 without changing the one or more selection conditions C with respect to during the previous unit time T0 such that the number of selections X0 becomes equal to the number of selections X1.

In step S212 following step S204, S208, or S210, the ECU 22 determines whether or not follow-up target vehicles according to the number of selections X1 has been selected. As a result, when the determination result is Yes, the processing proceeds to step S214. On the other hand, when the determination result is No, the processing returns to step S100.

In step S214, the ECU 22 uses the HMI device 24 to sequentially present one or more follow-up target vehicles selected by the processing of step S204, S208, or S210 to the driver of the subject vehicle 1. Specifically, for example, the presentation may be performed in order from the follow-up target vehicle that best satisfies the one or more selection conditions C. In addition, if a follow-up target vehicle that has not yet been presented remains after the presented follow-up target vehicle has been selected by the driver, presentation of the remaining follow-up target vehicles may be omitted.

According to the modification example described above, the one or more selection conditions C are changed such that the number of selections X1 of the follow-up target vehicles increases or decreases with respect to the number of selections X0. Accordingly, the subject vehicle 1 can follow the follow-up target vehicle at a more appropriate frequency according to the traffic volume.

4. Example of Application to Automated Driving Vehicle

The "change of the one or more selection conditions C depending on the traffic volume" according to the present disclosure may be applied to "follow-up driving control" in an automated driving vehicle in which all driving operations are performed by an automated driving system, instead of the "follow-up driving assistance" in a vehicle in which at least a part of driving operations is performed by the driver as in the examples described above (see FIGS. 3 and 4).

The automated driving system is realized by, for example, the vehicle control system 10 illustrated in FIG. 1 including the following configuration. That is, the ECU 22 is configured to process information of the vehicle state sensor 12, the recognition sensor 14, and the position sensor 16 to generate a target trajectory of the vehicle 1.

Figure 5:
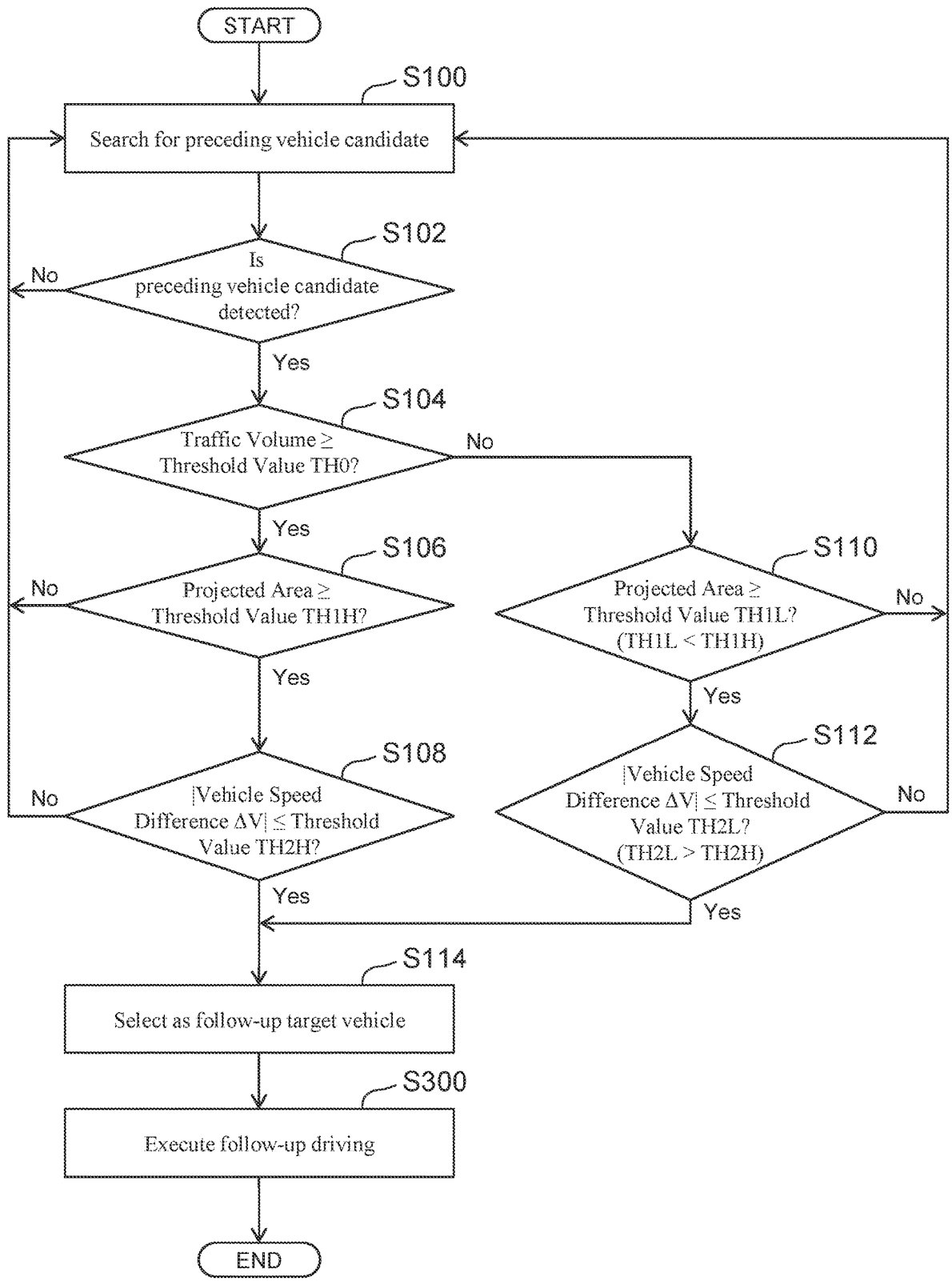
FIG. 5 is a flowchart illustrating an example of processing related to follow-up driving control in an automated driving vehicle according to the embodiment.

FIG. 5 is a flowchart illustrating an example of processing related to the follow-up driving control in the automated driving vehicle according to the embodiment. Differences between the processing of the flowchart shown in FIG. 3 and the processing of this flowchart will be described below.

In FIG. 5, after the follow-up target vehicle is selected in step S114, the processing of step S300 is executed instead of step S116. In step S300, the ECU 22 executes the follow-up driving by controlling the traveling device 20 such that the vehicle 1 follows the selected follow-up target vehicle.

Also in the example of application to the automated driving vehicle described above, by changing the one or more selection conditions C in accordance with the traffic volume around the subject vehicle 1, the subject vehicle 1 can follow a vehicle suitable for the follow-up at an appropriate frequency.

For the application to automated driving vehicles, the flowchart shown in FIG. 4 described above may be modified as follows. That is, instead of the processing of step S214, the ECU 22 may select one of the one or more follow-up target vehicles selected by the processing of step S204, S208, or S210 (for example, a preceding vehicle candidate that best satisfies the one or more selection conditions C), and perform the following-up driving such that the vehicle 1 follows the selected follow-up target vehicle.

In addition, in the example of application to automated driving vehicles, as described above, the vehicle 1 (ECU 22) itself can determine a follow-up target vehicle without requiring a person on the vehicle 1 to determine a follow-up target vehicle. Therefore, presentation of the follow-up target vehicle by the HMI device 24 can be made unnecessary. However, even in the example of the automated driving vehicle in which the person on the vehicle 1 does not need to perform the driving operation, the person using the HMI device 24 may select whether to follow the selected follow-up target vehicle.

5. Another Example of Traveling Environment Information

The information related to the traffic volume around the subject vehicle 1 described above corresponds to an example of the "traveling environment information around a specific vehicle" according to the present disclosure. However, as another example, the "traveling environment information" may include information related to at least one of a traveling section, a signal in a traveling direction of the subject vehicle 1, an intersection in the traveling direction, a construction site in the traveling direction, and a traffic accident occurrence point in the traveling direction, instead of or in addition to the information related to the traffic volume. Then, in order to "make it possible to follow a vehicle suitable for the follow-up at an appropriate frequency", the one or more selection conditions C may be changed as follows, for example, on the basis of various pieces of traveling environment information described above. In addition, the information on each of the traveling section, the signal in the traveling direction, and the intersection in the traveling direction can be acquired based on the map information and the position information described above, for example. The information on each of the construction site and the traffic accident occurrence point in the traveling direction can be acquired, for example, based on traffic information acquired from a traffic information center outside the subject vehicle 1 together with the map information and position information.

Specifically, FIG. 6 is a flowchart illustrating another example of the processing related to the follow-up driving assistance according to the embodiment. Differences between the processing of the flowchart shown in FIG. 3 and the processing of this flowchart will be described below.

In FIG. 6, instead of step S104, in step S400, the ECU 22 determines whether or not the current traveling section of the subject vehicle 1 is a general road or an exclusive road for automobiles. As a result, when the determination result is Yes (general road), the processing proceeds to step S106, and when the determination result is No (exclusive road for automobiles), the processing proceeds to step S110.

According to the processing shown in FIG. 6, the one or more selection conditions C are changed so as to be stricter on a general road than on an exclusive road for automobiles such as an expressway. In other words, the one or more selection conditions C are changed so as to be more relaxed on the exclusive road for automobiles than on the general road. As a result, it is possible to appropriately reduce the frequency of notification of the selection result of the follow-up target vehicle on the general road in which follow-up travel distance per one time is likely to be shorter than that on the exclusive road for automobiles. Also in the flowchart illustrated in FIG. 5 for the automated driving vehicle, the processing of step S400 may be executed instead of step S104.

In addition, when the subject vehicle 1 follows a vehicle which is violating a speed limit, there is a possibility that the subject vehicle 1 may also violate the speed limit due to the follow-up. In consideration of this point, the change of the one or more selection conditions C based on the information of the traveling section may be performed such that the one or more selection conditions are stricter on an automatic speed violation control section than on at least one of the general road and the exclusive road for automobiles. This makes it possible to appropriately reduce the frequency of notification in the automatic speed violation control section in which manual driving by the driver himself/herself is required due to the increased risk of vehicle speed violation increases.

Moreover, the one or more selection conditions C may be changed as follows based on the information regarding the signal in the traveling direction of the subject vehicle 1. That is, when the number of signals in the traveling direction is large, the one or more selection conditions C may be changed so as to be stricter than those when the number of signals is small. Further, when the distance from the subject vehicle 1 to a traffic light in the traveling direction is short, the one or more selection conditions C may be changed so as to be stricter than those when the distance is long. According to each of these examples, it is possible to appropriately reduce the frequency of notification in a traveling scene in which the follow-up travel distance is likely to be short.

Moreover, the one or more selection conditions C may be changed as follows based on the information regarding the intersection in the traveling direction of the subject vehicle 1. That is, when the number of intersections in the traveling direction is large, the one or more selection conditions C may be changed so as to be stricter than those when the number of intersections is small. Further, when the distance from the subject vehicle 1 to an intersection in the traveling direction is short, the one or more selection conditions C may be changed so as to be stricter than those when the distance is long. According to each of these examples, it is possible to appropriately reduce the frequency of notification in a traveling scene in which the follow-up travel distance is likely to be short.

Furthermore, when there is a construction site in the traveling direction of the subject vehicle 1, the one or more selection conditions C may be changed so as to be stricter than those when there is no construction site. Similarly, when there is a traffic accident occurrence point in the traveling direction of the subject vehicle 1, the one or more selection conditions C may be changed so as to be stricter than those when there is no traffic accident occurrence point. According to each of these examples, it is possible to appropriately reduce the frequency of notification in a situation where more stable traveling than usual is required to avoid a crisis.

The invention claimed is:

1. An automated driving vehicle comprising:
a vehicle selection device, having a processor configured to:
execute a selection process of selecting, as a target vehicle to be followed by a specific vehicle, a preceding vehicle candidate that satisfies one or more selection conditions based on surrounding vehicle information being information on one or more preceding vehicle candidates around the specific vehicle, wherein in the selection process, the processor is configured to change the one or more selection conditions in accordance with traveling environment information around the specific vehicle; and
select, as a follow-up target vehicle, the preceding vehicle candidate that satisfies the one or more selection conditions and controls the automated driving vehicle to follow the selected follow-up target vehicle at a predetermined frequency based on a traffic volume.

2. The vehicle selection device according to claim 1, wherein the traveling environment information includes information on at least one of a traveling section, a signal in a traveling direction of the specific vehicle, an intersection in the traveling direction, a construction site in the traveling direction, and a traffic accident occurrence point in the traveling direction.

3. The vehicle selection device according to claim 2, wherein
the traveling environment information includes information on the traffic volume, and
in the selection process, the processor is configured to:
cause the one or more selection conditions to be stricter when the traffic volume is large than when the traffic volume is small; and
relax the one or more selection conditions when the traffic volume is small than when the traffic volume is large.

4. The vehicle selection device according to claim 3, wherein in the selection process, the processor is configured to:
cause the one or more selection conditions to be strict such that, in response to an increase in the traffic volume, a first number of selections that selection of the target vehicle is made during a unit time from a current time point is less than a second number of selections that selection of the target vehicle is made during a unit time immediately before the current time point; and
relax the one or more selection conditions such that, in response to a decrease in the traffic volume, the first number of selections is greater than the second number of selections.

5. The vehicle selection device according to claim 2, wherein the traveling environment information includes information on the traveling section, and
in the selection process, the processor is configured to:
cause the one or more selection conditions to be stricter when the traveling section is a general road than when the traveling section is an exclusive road for automobiles; and
relax the one or more selection conditions when the traveling section is an exclusive road for automobiles than when the traveling section is a general road.

6. The vehicle selection device according to claim 1, further comprising a display that notifies a person on the specific vehicle of a result of selection of the target vehicle by the selection process.

7. A vehicle selection method of an automated driving vehicle for selecting, with a computer, a target vehicle to be followed by a specific vehicle, comprising:
executing a selection process of selecting, as the target vehicle, a preceding vehicle candidate that satisfies one or more selection conditions based on surrounding vehicle information being information on one or more preceding vehicle candidates around the specific vehicle;
changing the one or more selection conditions in accordance with traveling environment information around the specific vehicle; and
selecting, as a follow-up target vehicle, the preceding vehicle candidate that satisfies the one or more selection conditions and controls the automated driving vehicle to follow the selected follow-up target vehicle at a predetermined frequency based on a traffic volume.

* * * * *